(12) United States Patent
Vagelos

(10) Patent No.: US 7,742,468 B2
(45) Date of Patent: Jun. 22, 2010

(54) SYSTEMS AND METHODS FOR PROVIDING ENHANCED TELEPHONE SERVICES

(75) Inventor: Ted Vagelos, Warren, NJ (US)

(73) Assignee: Frontier Communications Corporation, Stamford, CT (US)

( * ) Notice: Subject to any disclaimer, the term of this patent is extended or adjusted under 35 U.S.C. 154(b) by 0 days.

(21) Appl. No.: 12/552,170

(22) Filed: Sep. 1, 2009

(65) Prior Publication Data

US 2009/0310771 A1    Dec. 17, 2009

Related U.S. Application Data

(63) Continuation of application No. 11/673,528, filed on Feb. 9, 2007.

(51) Int. Cl.
  *H04L 12/66* (2006.01)
  *H04M 1/64* (2006.01)
  *G06F 7/04* (2006.01)

(52) U.S. Cl. .......................... 370/356; 379/88.01; 726/2

(58) Field of Classification Search ....................... None
See application file for complete search history.

(56) References Cited

U.S. PATENT DOCUMENTS

| 5,724,411 | A | 3/1998 | Eisdorfer et al. |
| 6,130,938 | A | 10/2000 | Erb |
| 6,697,478 | B1 | 2/2004 | Meldrum et al. |
| 6,754,322 | B1 | 6/2004 | Bushnell |
| 7,106,848 | B1 | 9/2006 | Barlow et al. |
| 2004/0125931 | A1* | 7/2004 | Archer .................. 379/201.01 |
| 2006/0188084 | A1* | 8/2006 | Rogers et al. .......... 379/265.01 |
| 2007/0165811 | A1* | 7/2007 | Reumann et al. ....... 379/201.01 |

* cited by examiner

*Primary Examiner*—Melanie Jagannathan
(74) *Attorney, Agent, or Firm*—Proskauer Rose LLP

(57) ABSTRACT

A method for providing enhanced telephone services via a computerized telephone services device for use in conjunction with multiple telephone lines and providers. According to embodiments of the invention, a subscriber to telephone services or a group of subscribers may be reached on multiple telephone lines from a single dial-in number; calls in progress may be transferred seamlessly from one line associated with a subscriber to another; and group calling features may be enhanced.

11 Claims, 7 Drawing Sheets

SYSTEMS AND METHODS FOR PROVIDING ENHANCED TELEPHONE SERVICES

CROSS REFERENCE TO RELATED APPLICATIONS

This application is a continuation of U.S. patent application Ser. No. 11/673,528 filed on Feb. 9, 2007, the disclosure of which is hereby incorporated by reference in its entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates generally to methods and systems for routing telephone calls, and more particularly provides for management of multiple telephone lines and services corresponding to a single person, entity, or group and for improving the utility and efficiency of multiple telephone lines in such circumstances.

BACKGROUND

The number of ways to deliver telephone service continues to grow. "Plain old telephone service" (POTS), comprising analog telephones connected via pairs of copper wires to the public switched telephone network (PSTN), is now complemented by, for example, cellular wireless telephony, voice over internet protocol (VoIP), WiFi VoIP clients, and satellite-based telephony, among other services. A consequence is that people can remain in contact in places and circumstances where and when it was previously impossible.

Because people can be reachable, however, more and more people are expected to do so. Each form of telephone service can require a separate telephone number, line, or both, and the result can be that a caller must attempt calls to several different numbers before reaching the desired person. It is conceivable, for example, that a single person may have one phone number at work, one or more phone numbers at home, a personal mobile phone number, a work mobile phone number, and a phone number corresponding to a VoIP softphone.

FIG. 1 is a block diagram illustrating interconnected components of a telephone network 100, such as may be found in the prior art. The network 100 includes the public switched telephone network ("PSTN") 105, which is the worldwide set of interconnected telephone networks that deliver fixed telephone services to the general public and are usually accessed by telephones and private branch exchanges ("PBX"), transmitting voice, other audio, video, and data signals.

The PSTN 105 comprises a plurality of interconnected switches. The PSTN 105 is formed from the interconnection of e.g., third-party switch 106, provider switch 107, and other switches (not pictured) within the PSTN 105. Fast digital links, referred to as "trunks" 108, connect switches in most of the PSTN 105, although some older analog equipment remains in use.

To connect something, e.g., the provider's switch 107, to the PSTN 105, typically means to connect it via a trunk 108 to another switch (not pictured) within the PSTN. Consistent with the usage common in the art, however, systems will be described herein as connected to the PSTN 105 as such, with the existence of a plurality of interconnected switches (not pictured) within the PSTN 105 left implicit. FIG. 1 accordingly shows the third-party switch 106 and provider's switch 107 separate from the PSTN 105, although they are part of it.

The PSTN 105 comprises analog phones, which participate in the PSTN 105 via switches. As depicted in FIG. 1, an analog phone 110 connects via a pair of copper wires 111 to the third-party switch 106. Similarly, other analog phones 112 connect via pairs of copper wires 113 to the provider's switch 107. Because they exist on the edges of the PSTN 105, analog phones may be referred to as "edge devices."

An analog phone 112 is so called because it sends and receives analog electrical signals that represent voice data. Internally, however, the PSTN 105 primarily uses digital switches and digital trunks. Thus, a provider's switch 107 converts between the analog data used by the analog phone 112a and the digital data used internally by the switch 107 and exchanged within the PSTN 105.

Although not depicted in FIG. 1, switches within the PSTN 105 exist in a hierarchy. At the lowest level of the hierarchy are switches, such as the third-party switch 106 and the provider's switch 107, that connect both to the PSTN 105 and to analog telephones. For historical reasons, these switches, which connect both to edge devices and to other switches, are often called "class 5 switches." A single class 5 switch may serve hundreds or thousands of telephone lines.

Higher-level switches (not pictured) may connect only to other switches and may be used, e.g., to establish a connection between different geographic areas. To handle telephone calls between different metropolitan areas, an inter-exchange carrier ("IXC") connects to the PSTN 105 directly or indirectly. An IXC maintains its own facilities, such as, e.g., trunks and switches (not pictured), to route telephone calls. A provider 115 of telecommunications services may have its own IXC facilities 121 and may connect to the PSTN 105 directly or, as depicted in FIG. 1, through an interface and control system 125. A third-party carrier may also provide an IXC 120, which may connect directly to the PSTN 105.

To enable forms of telephone service other than POTS to interoperate with the PSTN 105, a provider 115 of telecommunications services may connect, e.g., one or more switches, gateways, or both to the PSTN 105. As depicted in FIG. 1, a provider 115 has connected a switch 107 to the PSTN 105. Besides the connections 113 to analog phones 112, the provider's switch 107 has a connection via a dedicated digital trunk 116 to a private branch exchange ("PBX") 121. A PBX 121 may provide switching, signaling, and/or analog-to-digital conversion functions for multiple analog phones 122, digital phones 123, or both and typically exists within a large organization with many telephone lines. A PBX 121 may allow calling within the organization to take place without use of any facilities of the PSTN 105.

A provider 115 may use an interface (or gateway) system 125 to bridge telephony over the PSTN 105 and VoIP transmitted across a packet-switched data network 126, such as the Internet. The interface system 125 connects to the IP network 126, e.g., via an Ethernet cable 127 connected to a router (not pictured). A VoIP client, such as, e.g., a residential analog telephone adapter 128 or a commercial VoIP PBX 129 also connects to the IP network 126, exchanging data packets with the interface system 125. Other VoIP clients may use the network 126, such as a VoIP client 130 that uses WiFi to connect wirelessly to the network 126, or a computer program (called a "soft client") that executes on a networked computer 131.

The interface system 125 also connects to the PSTN 105 via a trunk 108*c*. The interface system 125 supports calls among VoIP clients by, e.g., providing directory and/or addressing information. The interface system 125 also enables calls to cross between the PSTN 105 and the IP network 126 by, e.g., translating data and signaling protocols.

Other services may also be provided through the PSTN 105. For example, a provider of wireless telephone services 135 may also connect to the PSTN 105 through a digital trunk 108*e*.

A telephone call may begin from, e.g., an analog phone 112*a* connected to the provider's switch 107. The switch 107 detects the dialed number and establishes the call. If the destination of the call is another analog phone 112*b* connected to the provider's switch, the switch routes the call using an internal trunk (not pictured). Otherwise, the switch routes the call through the PSTN 105, e.g., directly to a third-party's switch 106 or via the provider's IXC 121 or a third party's IXC 120.

The PSTN 105 is a circuit-switched network, which typically means that it reserves the necessary bandwidth all along the route taken by a call in progress, even when the call does not need all of the reserved bandwidth. Multiplexing techniques, which are well known in the art, are used to send multiple digitized telephone calls simultaneously over the same trunk 108. Switches within the PSTN 105 exchange signaling information used to, e.g., information used to create, route, terminate, and account for telephone calls (among other functions) over a path that is physically or logically distinct from the data paths, and most commonly do so using the protocol known in the art as Signaling System #7 ("SS7").

SUMMARY

A method is provided for use in conjunction with multiple telephone lines and providers. According to embodiments of the invention, a subscriber to telephone services or a group of subscribers may be reached on multiple telephone lines from a single dial-in number; calls in progress may be transferred seamlessly from one line associated with a subscriber to another; and group calling features may be enhanced.

In accordance with an embodiment, there is a method for providing enhanced telephone services via a computerized telephone services device. The method comprises recognizing, by the computerized telephone services device, tones generated by an originating telephone line, the originating telephone line being associated with a calling number, wherein the tones represent a common number associated with a called party and assigned to two or more telephone lines. The method further comprises identifying, by the computerized telephone services device, the two or more telephone lines associated with the common number. The method further comprises causing, by the computerized telephone services device, a first telephone line and a second telephone line of the two or more telephone lines to ring substantially simultaneously. The method further comprises awaiting, by the computerized telephone services device, the called party to answer via one of the two or more telephone lines. The method further comprises sending, from the computerized telephone services device, a challenge to the answered telephone line and waiting for the party to satisfy the challenge if one of the two or more telephone lines is answered. The method further comprises establishing, by the computerized telephone services device, a first telephone connection between the originating telephone line and the answered telephone line if the challenge is satisfied. The method further comprises detecting, by the computerized telephone services device, entry of a code from the answered telephone line, the code indicative of a request to transfer the telephone connection from the answered telephone line to a third telephone line associated with the common number. The method further comprises calling, by the computerized telephone services device, the third telephone line in response to the detection of the service code. The method further comprises detecting, by the computerized telephone services device, whether the third telephone line has been answered. The method further comprises establishing, by the computerized telephone services device, a second telephone connection between the originating telephone line and the third telephone line if the third telephone line is answered. The method further comprises recognizing, by the computerized telephone services device, tones generated by an originating telephone line, wherein the tones represent a request for a telephone conference over a conference line and are associated with one or more telephone lines of the called party. The method further comprises determining, by the computerized telephone services device, whether the calling telephone number is included in a set of defined telephone numbers permitted to connect to the conference line without further authentication. The method further comprises establishing, by the computerized telephone services device, a telephone connection between the originating telephone line and the conference line if the set of defined telephone numbers includes the calling telephone number.

In some examples, the method may also comprise establishing, by the computerized telephone services device, a telephone connection between the originating telephone line and a voice mailbox if none of the telephone lines associated with the common number is answered. The method may also comprise disconnecting, by the computerized telephone services device, the second telephone line from the first telephone connection upon establishment of the second telephone connection. The method may also comprise sending, from the computerized telephone services device, a message to the originating telephone line. The message may include a conventional ringing tone, an audio message, a text message, or any combination thereof.

In some examples, the method may further comprise sending, from the computerized telephone services device, an indication to the originating telephone line that one of the two telephone lines is engaged, that both of the two telephone lines are engaged, that the called party is unavailable, or any combination thereof. The method may further comprise repeating, by the computerized telephone services device, the sending and the waiting a predetermined number of times or until the called party satisfies the challenge, whichever occurs first. The method may further comprise determining, by the computerized telephone services device, that the challenge is not satisfied and therefore not establishing the telephone connection between the originating telephone line and the answered telephone line. The challenge may include a personal identification number (PIN), a password, a name, a number, a character, a code, or any combination thereof.

The method may further comprise disconnecting the second telephone line from the first telephone connection. The service code includes a predetermined set of telephone tones. The service code may begin with a common prefix indicating to the switch that an instruction follows. The common prefix may include a single tone. The method may further comprise detecting by the switch entry of an ID code identifying the third telephone line. The ID code may identify a home telephone line, a mobile telephone line, a VOIP line, etc. The second telephone line and the third telephone line may be linked with a common telephone number associated with the single user and with the switch. The method may further comprise sending a challenge to the third telephone line; and establishing the second telephone connection if the third telephone line satisfies the challenge.

DETAILED DESCRIPTION

The following description is provided to enable any person skilled in the art to make and use the invention and is provided in the context of a particular application. Various modifications to the embodiments are possible, and the generic principles defined herein may be applied to these and other embodiments and applications without departing from the spirit and scope of the invention. Thus, the invention is not intended to be limited to the embodiments and applications shown, but is to be accorded the widest scope consistent with the principles, features and teachings disclosed herein.

Figure 2:
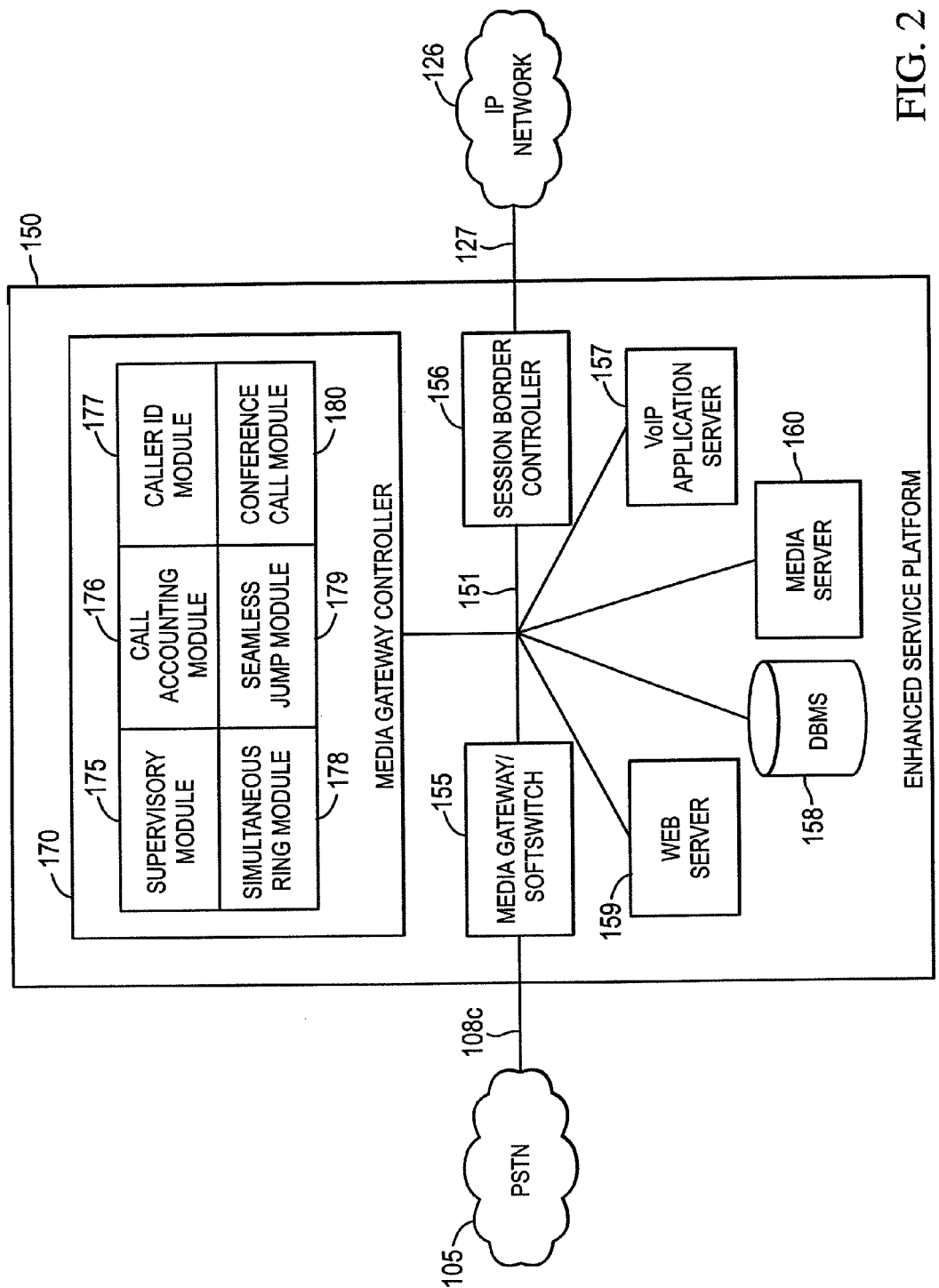
FIG. 2 is a block diagram of an enhanced service platform, according to an embodiment of the invention.

FIG. 2 depicts an exemplary system 150, referred to herein as an Enhanced Service Platform 150, which comprises one or more systems that a provider 125 may implement to manage VoIP telephony and/or to provide a gateway between circuit-switched and packet-switched telephony. An Enhanced Service Platform 150 as depicted in FIG. 2 may provide certain additional functions according to an embodiment of the invention.

As depicted in FIG. 2, the components of the Enhanced Service Platform 150 are connected to one another by one or more data networks 151. Although depicted as a single network 151 in a star topology, one skilled in the art will recognize that other network topologies and/or combinations of networks may connect the components to one another.

In an embodiment of the invention, the Enhanced Service Platform 150 includes a media gateway 155, which connects internally to the network 151 and, via a digital trunk 108c, to the PSTN 105. The Enhanced Service Platform also includes a session border controller 156 that connects to both the internal network 151 and to the IP network 126. According to an embodiment of the invention, other components of the Enhanced Service Platform 150, connected via the internal network 151, may include, e.g., a VoIP application server 157, a database management system 158, a Web server 159, a media server 160, and a media gateway controller 170.

In the depicted embodiment of the invention, the media gateway controller 170 includes a plurality of modules. A supervisory module 175 provides logic that directs the functioning of the media gateway controller 170 and its other modules. A call accounting module 176 provides logic that gathers and stores information about calls, e.g., for billing, performance monitoring, network security, etc. Other modules may provide logic supporting services such as Caller ID 177, simultaneous ringing 178 (described in greater detail with reference to FIG. 5), seamless call jumping 179 (described in greater detail with reference to FIG. 6), and conference calling 180 (described in greater detail with reference to FIG. 7). The media gateway controller may contain other modules (not pictured) with other functions in addition to or instead of some or all of the depicted modules.

According to an embodiment of the invention, the media gateway 155, which may sometimes be referred to as a "softswitch," switches between and within circuit-switched networks, such as the PSTN 105, and packet-switched networks, such as the IP network 126. The media gateway 155 may be configured to translate data and/or control signals between different protocols that may be used on the different networks.

Thus, from the perspective of the PSTN 105, the media gateway 155 may appear to be a class 5 switch. As such, the media gateway 155 may send and receive both digitized voice and signaling information. The media gateway 155 may also serve as a bridge between the circuit-switched PSTN 105 and an IP data network, such as the Internet 127. As such, it may permit calls to take place between and among, e.g., VoIP clients connected to the packet-switched network 126 and POTS clients connected to the PSTN 105. This kind of inter-operation is transparent to the participants in any particular call.

A session border controller 156 may exist between the media gateway 155 and the packet-switched network 127. In an embodiment of the invention, one function of the session border controller 156 is to enable connections between the Enhanced Service Platform 150 and VoIP clients by, e.g., traversing firewalls, resolving problems related to the use of network address translation (NAT), and/or routing VoIP calls and/or the packets that contain voice and/or signaling information as a VoIP call is built up, carried on, and torn down. The session border controller 156 may also protect the Enhanced Service Platform 150, e.g., by serving as a network firewall, protecting against denial-of-service attacks, and/or preventing theft of services. These and other functions that may be implemented by a session border controller 156 are well known in the art.

In an embodiment of the invention, VoIP telephone calls are managed by a VoIP application server 157 as depleted in FIG. 2. The VoIP application server 157 may perform one of more functions, such as, e.g., call and subscriber management, VoIP signaling according to one or more protocols, billing and/or accounting, and/or providing enhanced calling features, such as call waiting and caller ID, to VoIP clients. The VoIP application server 157 may work in conjunction with a database management system 158, such as is well known in the art, to store and retrieve, e.g., subscriber, call, and/or directory information.

The Enhanced Service Platform 150 may provide administrative interfaces to administrators, subscribers, or both, according to an embodiment of the invention. Depending on the embodiment of the invention, such interfaces may be provided, e.g., in the form of one or more Web applications, which may be provided through a Web server 159. In an embodiment of the invention, an administrative Web application may be supported by a multiple-tier architecture, such as is well known in the art. In such an architecture, the Web server 159 provides an interface, presented on, e.g., a user's Web browser, to one or more applications that may exist on the VoIP application server 157 and/or another application server (not pictured). Such an application may also provide information hosted by, e.g., the database management system 158 and/or a media server 160.

The switching functions of the Enhanced Service Platform 150 may be directed by a media gateway controller 170, according to an embodiment of the invention. The media gateway controller 170 may exchange signals with the PSTN 150 via the media gateway 155. Such signals may be used, e.g., to build up, maintain, and/or tear down calls over the PSTN 105. The media gateway controller 170 may use these signals to provide other services, including but not limited to enhanced services according to an embodiment of the invention.

In an embodiment of the invention, modules within the media gateway controller 170 provide one or more functions of the Enhanced Service Platform 150. The configuration of one or more modules according to an embodiment of the invention may vary depending on the configuration and/or capabilities of some or all components of the Enhanced Service Platform 150. For example, in an embodiment of the invention, the conferencing module may exist within the VoIP application server 157 instead of the media gateway controller 170 as depicted in FIG. 2. In an embodiment of the invention, multiple components of the Enhanced Service Platform 150 may include modules involved in providing one or more functions.

In this context, "module" is to be taken in a broad sense, and the description of embodiments of the invention in terms of one or more modules is to be regarded as illustrative and in no way limiting. Depending on the embodiment of the invention, any module may include hardware, software, or a combination of the two. Additionally, any module may be actual, corresponding to one or more distinct units of hardware, software, or both, or it may be logical, being considered to be that hardware, software, or both functioning as described, regardless of any other function or functions that the corresponding hardware, software, or both may perform or be capable of performing.

Further, as one skilled in the art will recognize, other configurations of modules in other embodiments of the invention are equivalent to the configuration described herein. A function described herein as performed by a single module may in an embodiment of the invention be performed by two or more modules. Conversely, functions described herein as performed by distinct modules may, according to an embodiment of the invention, be performed by one or more common modules.

Figure 1:
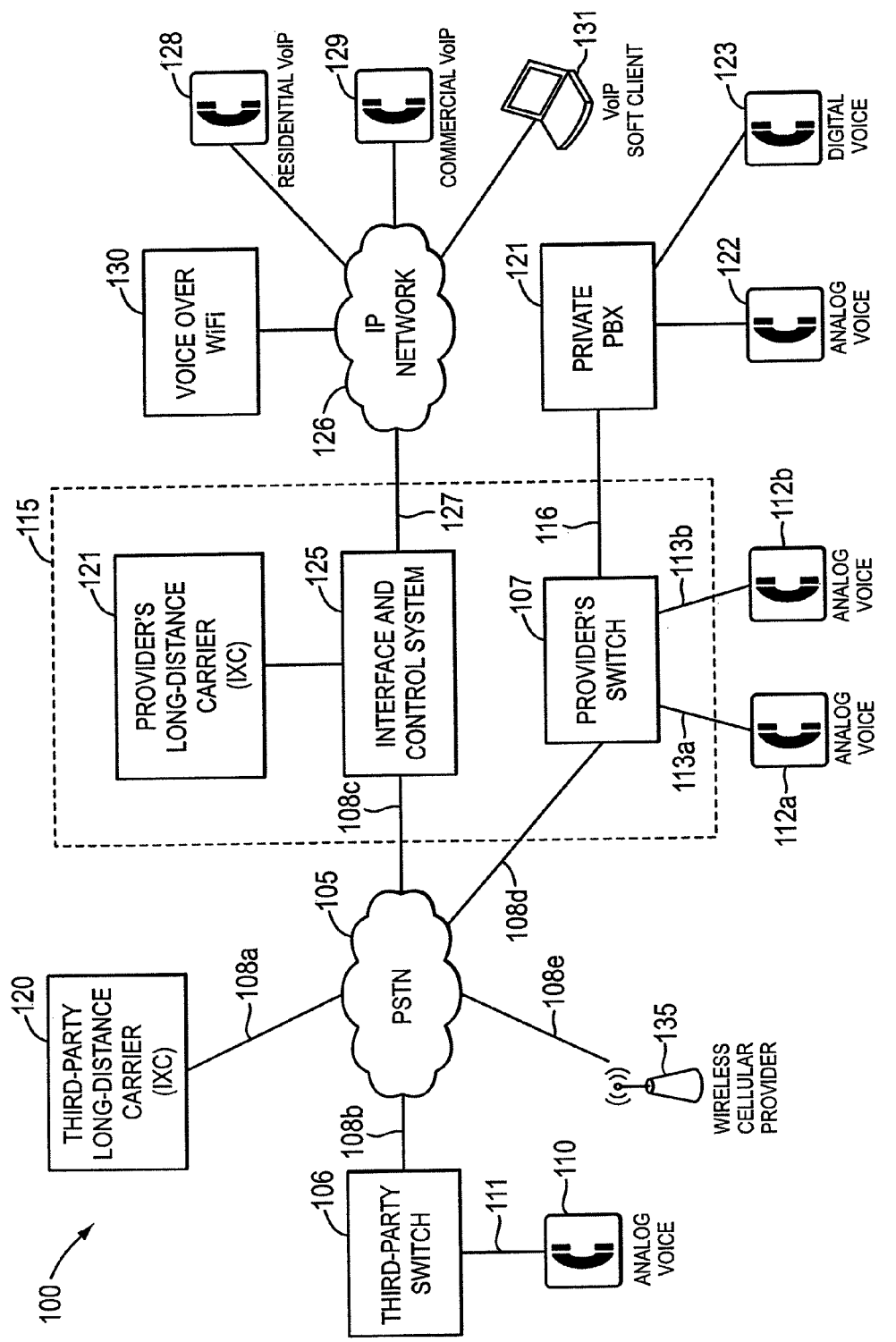
FIG. 1 is a block diagram of components of a telephone network such as may be found in the prior art.
Figure 3:
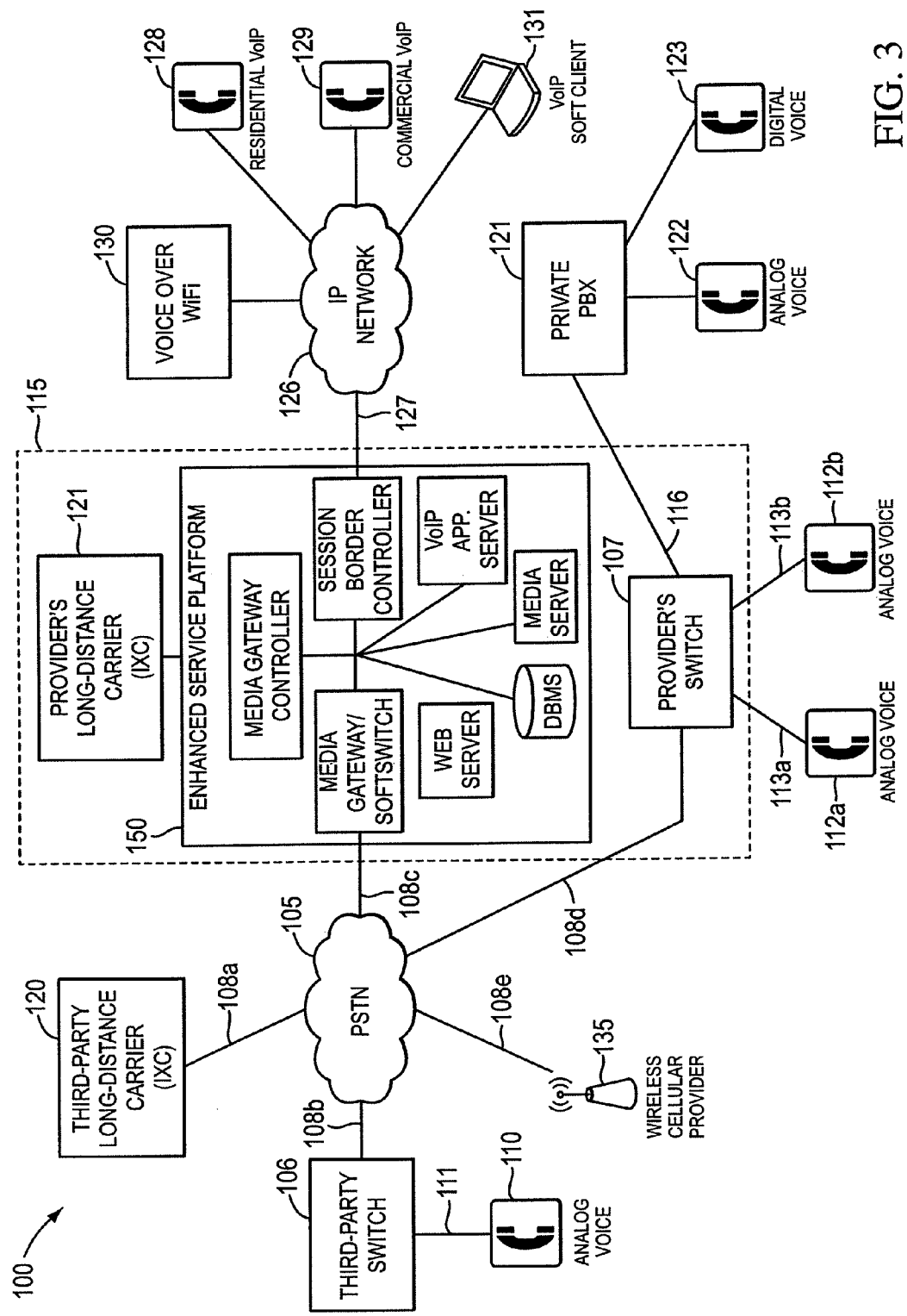
FIG. 3 is a block diagram of components of a telephone network that includes an enhanced service platform, according to an embodiment of the invention.

FIG. 3 depicts the Enhanced Service Platform 150 within the telephone network 100 according to an embodiment of the invention. In the depicted embodiment of the invention, the Enhanced Service Platform 150 in FIG. 3 takes over and expands the role of the interface and control system 125 depicted in FIG. 1. The provider 115 may place the Enhanced Service Platform 150 between the PSTN 105 and the IP network 126, e.g., to bridge the networks and/or to support the provider's services according to an embodiment of the invention.

Figure 4:
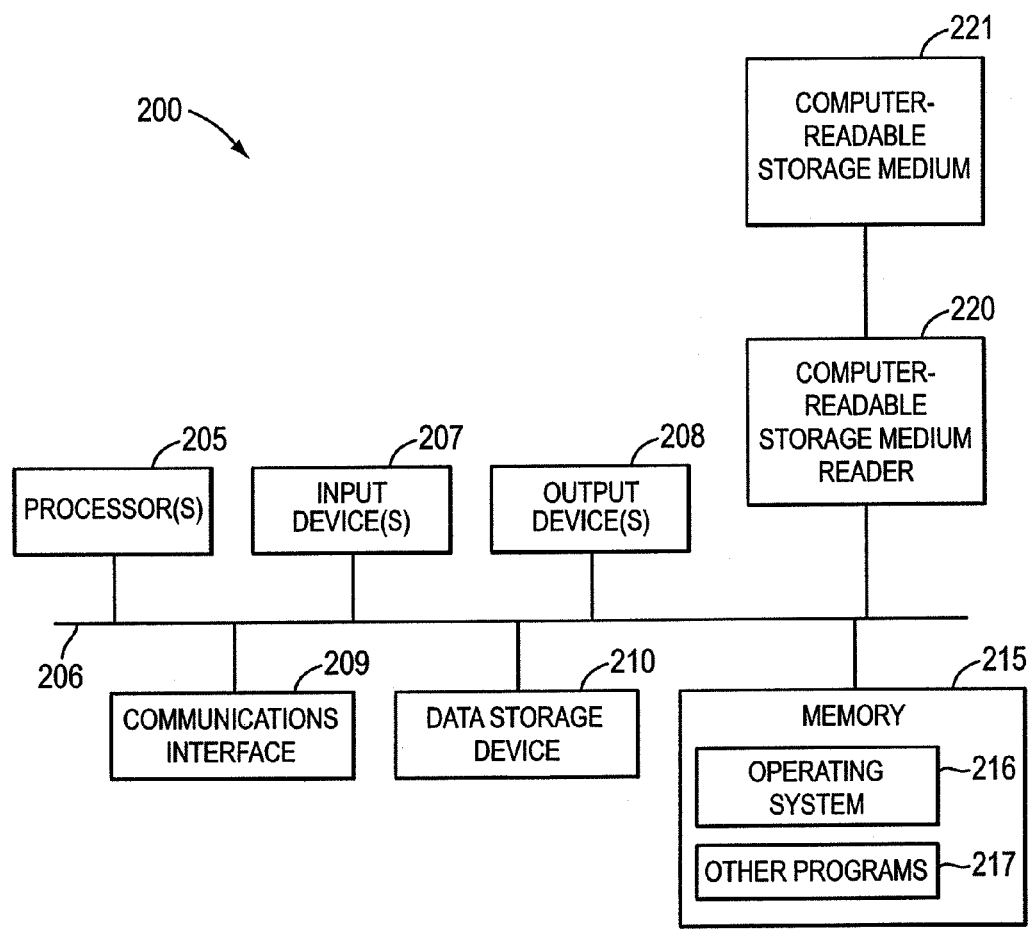
FIG. 4 is a block diagram illustrating details of a computer system.

FIG. 4 is a block diagram illustrating details of a computer system, of which one or more switches, gateways, controllers, or some or all of them may be an instance. Computer system 200 includes a processor 205, such as an Intel Pentium® microprocessor or a Motorola Power PC® microprocessor, coupled to a communications channel 206. The computer system 200 further includes an input device 207 such as a keyboard or mouse, an output device 208 such as a cathode ray tube display, a communications interface 209, a data storage device 210 such as a magnetic disk, and memory 215 such as Random-Access Memory (RAM), each coupled to the communications channel 206. The communications interface 209 may be coupled to a network such as the wide-area network commonly referred to as the Internet. One skilled in the art will recognize that, although the data storage device 210 and memory 215 are illustrated as different units, the data storage device 210 and memory 215 can be parts of the same unit, distributed units, virtual memory, etc.

The data storage device 210 and/or memory 215 may store an operating system 216 such as the Microsoft Windows XP, Linux, the IBM OS/2 operating system, the MAC OS, or UNIX operating system and/or other programs 217. It will be appreciated that a preferred embodiment may also be implemented on platforms and operating systems other than those mentioned. An embodiment may be written using JAVA, C, and/or C++ language, or other programming languages, possibly using object oriented programming methodology.

One skilled in the art will recognize that the computer system 200 may also include additional information, such as network connections, additional memory, additional processors, LANs, input/output lines for transferring information across a hardware channel, the Internet or an intranet, etc. One skilled in the art will also recognize that the programs and data may be received by and stored in the system in alternative ways. For example, a computer-readable storage medium (CRSM) reader 220 such as a magnetic disk drive, hard disk drive, magneto-optical reader, CPU, etc. may be coupled to the communications bus 206 for reading a computer-readable storage medium (CRSM) 221 such as a magnetic disk, a hard disk, a magneto-optical disk, RAM, etc. Accordingly, the computer system 200 may receive programs and/or data via the CRSM reader 220. Further, it will be appreciated that the term "memory" herein is intended to cover all data storage media whether permanent or temporary.

Figure 5:
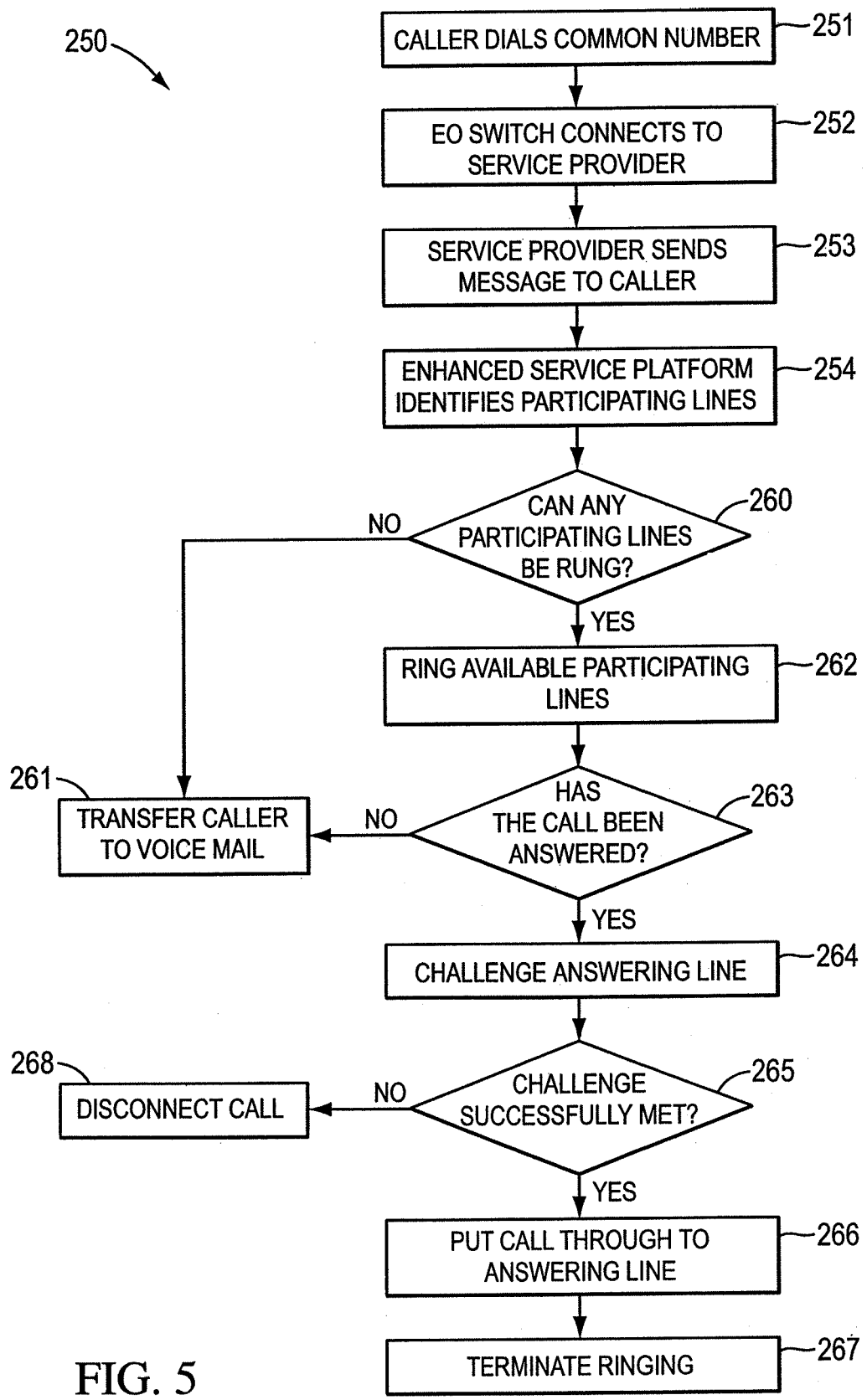
FIG. 5 is a flowchart illustrating a method of operating simultaneous ringing according to an embodiment of the invention.

FIG. 5 depicts simultaneous ringing 250 according to an embodiment of the invention. In step 251, a caller dials, e.g., from an analog phone 110 (FIG. 3), a common number that has been assigned to one or more telephone lines, which may be referred to herein as "participating lines." The switch 106 (FIG. 3) connected to the originating phone 110 detects that the caller has taken the phone off the hook and recognizes, e.g., the DTMF tones representing the common number. In response, the switch 106 connects in step 252 (FIG. 5) to the media gateway 155 within the Enhanced Service Platform 150. At this point, from the perspective of the caller's switch 106, a call has been built up.

The Enhanced Service Platform 150 then attempts to ring participating lines to complete the call. In an embodiment of the invention, the media gateway 155 informs the media gateway controller 170 of the incoming call request. The supervisory module 175 causes retrieval of data, e.g., from the DBMS 158, for use in deciding how to handle the request. If the requested number is a front end to one or more participating lines, the supervisory module 175 directs the simultaneous ring module 178 to try to establish the call.

In an embodiment of the invention, the simultaneous ring module 178 causes the Enhanced Service Platform 150 to send a message to the caller in step 253, as it tries to establish the call. The message may be, for example, "Please hold while [name of subscriber] is located." In an embodiment of the invention, the Enhanced Service Platform 150 may send a conventional ringing tone to the caller in addition to or instead of a message. The data comprising the representation of the message and/or the ringing tone may be, e.g., provided by the media server 160 to the media gateway 155 at the direction of the simultaneous ring module 178 of the media gateway controller 170.

In an embodiment of the invention, the simultaneous ring module 178 identifies in step 254 the participating lines that will ring. This step 254 commonly involves looking up the participating line, e.g., by the DBMS 158. If the simultaneous ring module 178 determines in the process that the call has originated from a participating line, then the module 178 will exclude that originating line from the group of lines that ring.

For each line that will ring, the simultaneous ring module 178 instructs the media gateway 155 to signal the corresponding switch 107 to attempt to ring the line. The form and transmission method of the signal correspond to the configuration of each signaled switch. For example, a switch in the PSTN 105 may be signaled to ring via the SS7 network with an Initial Address Message, or IAM. Other types of switches and the corresponding methods for signaling are also well known in the relevant art.

The media gateway 155 informs the media gateway controller 170 of the responses to the ring requests. For example, in response to a ring request, a switch 107 may return a busy signal. In an embodiment of the invention, the simultaneous ring module 178 may respond by instructing the media gateway 155 to stop trying to ring that line.

Alternatively, the switch 107 may signal that the line is engaged, e.g., on another call. In an embodiment of the invention, the response may depend on the availability of call waiting on the engaged line. In such an embodiment, the simultaneous ring module 178 may respond by instructing the media gateway 155 to send a call-waiting alert to the engaged line if that service is available. If call waiting is not available, e.g., because the engaged line does not support it or the subscriber has disabled it, the simultaneous ring module 178 may respond by instructing the media gateway 155 to stop trying to ring that line.

In an embodiment of the invention, if the Enhanced Service Platform 150 determines in step 260 that it cannot ring any participating line, it may in step 261 transfer the caller directly to a voice mailbox. The simultaneous ring module 178 may in that case inform the supervisory module 175 that the attempt to set op the call failed. In response, the supervisory module 175 may direct the media gateway 155 to switch the call to a voice mailbox provided by, e.g., an application on the media server 160 or the VoIP application server, which may in turn retrieve prompting messages and/or store messages through the DBMS 158.

Depending on the embodiment of the invention, the Enhanced Service Platform 150 may also signal the caller that the subscriber is not available; for example, the simultaneous ring module 178 may cause the media gateway 155 to retrieve a voice announcement or a busy signal from the media server 160 and then to send it to the caller. Other possible responses are known in the art, and, in an embodiment of the invention, the type of response may be configured, e.g., by the subscriber or the provider.

In step 262, the available participating lines ring. In an embodiment of the invention, one or more of the participating lines, e.g., the subscriber's primary home telephone line, may be designated or configured as a preferred line. In such an embodiment, the ringing signal may be sent to the preferred line or lines shortly before it is sent to other participating lines. The head-start given to the preferred line or lines will vary depending on the embodiment of the invention, but will commonly be long enough to increase the likelihood that a preferred line will be answered before a non-preferred line, yet brief enough that the ringing time of the non-preferred line or lines is sufficient to allow the line to be answered before the caller hangs up. In an embodiment of the invention, the head-start will be between one and three seconds.

In an embodiment of the invention, the Enhanced Service Platform 150 may at step 264 present a challenge when a ringing line is answered. For example, a challenge may include a voice announcement, such as, "This call is for [subscriber's name]. Press 'one' to accept the call, or press 'two' to reject it." The simultaneous ring module 178 may effect this step by directing the media server 160 to send the announcement to the answered line, e.g., through the media gateway 155, and by directing the media gateway 155 to monitor the call for responsive DTMF tones. The media gateway 155 sends any detected input to the simultaneous ring module 178. In step 265, the simultaneous ring module 178 determines whether the detected input satisfies the challenge. If so, the simultaneous ring module 178 may direct the supervisory module 175 to put the call through as depleted in step 266, or to disconnect the line as depicted in step 268.

Alternatively, in an embodiment of the invention, the challenge may prompt for a PIN, password, or other identifying information. If in step 265 the correct response is received, the Enhanced Service Platform 150 may pat the call through. If no response or an incorrect response is given, the Enhanced Service Platform 150 may, depending on the embodiment of the invention and/or its configuration, prompt the user to try again (not shown) or may disconnect the line as shown in step 268. This may be especially valuable when many people share a single telephone number, such as a home line in, e.g., a college dormitory. The challenge may be capable of preventing certain roommates from accepting calls intended for other residents.

In an embodiment of the invention, participating lines may be individually configured to require a successful challenge or to put the call through to an answered line without a challenge. Depending on the embodiment of the invention, such configuration may be done by a user, a system administrator, or both.

Once the call has been put through to a participating line, in step 267, the simultaneous ring module 178 causes the media gateway 155 to direct the switches associated with other ringing lines, if any, to stop ringing. In an embodiment of the invention, if the call is not answered after a set time, the Enhanced Service Platform 150 may, in step 263 cause all participating lines to stop ringing and transfer the call to a voice mailbox.

Figure 6:
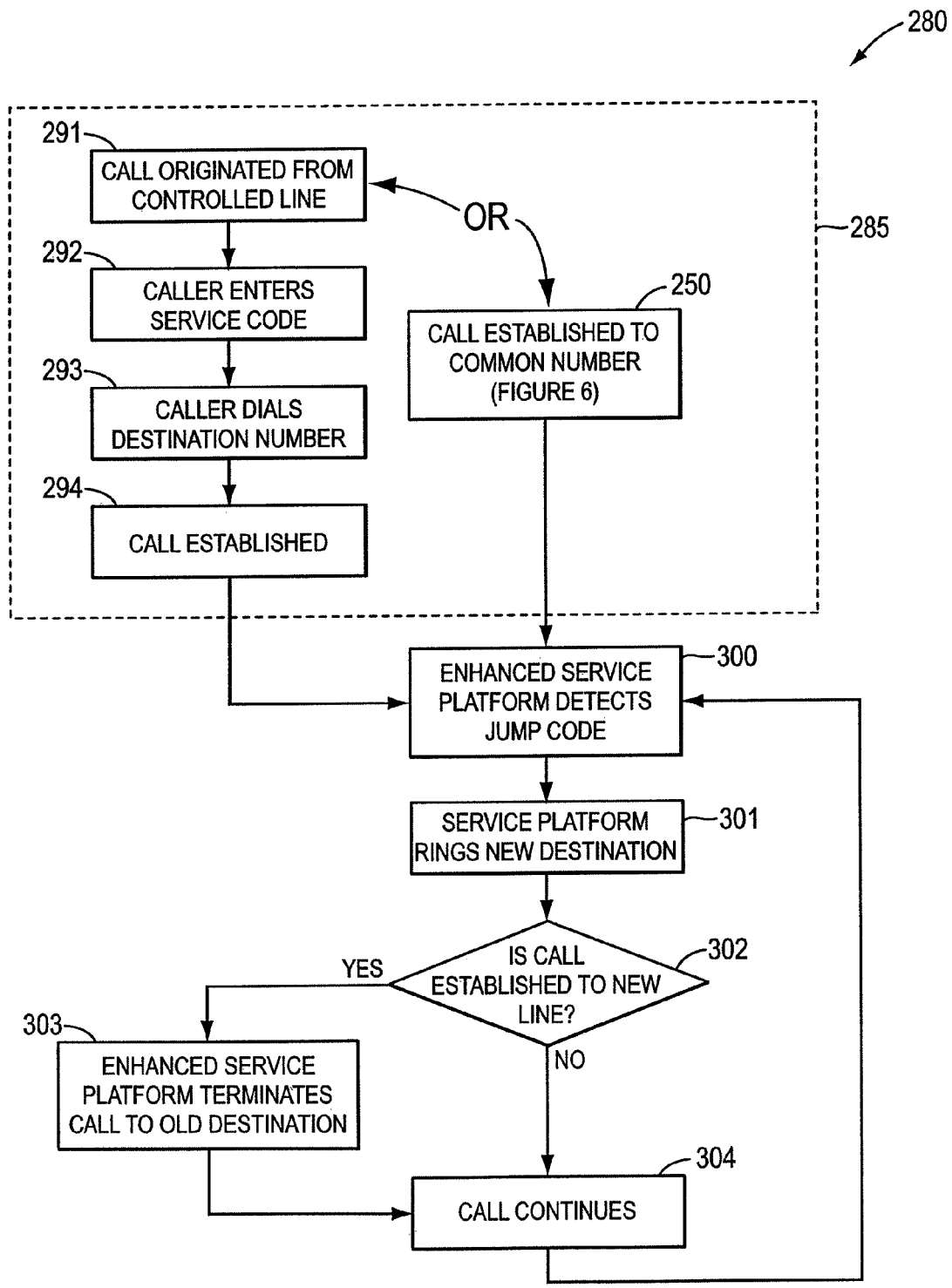
FIG. 6 is a flowchart illustrating a method of seamless jumping of a telephone call according to an embodiment of the invention.

FIG. 6 depicts operation of a seamless jump 280 according to an embodiment of the invention. A managed call is established 285, as depicted in FIG. 6, in one of two ways. First, a managed call may be established by a call to the subscriber's common number in step 250, as depicted in FIG. 5 in connection with the discussion of simultaneous ringing.

The second depicted way to establish a managed call 285 begins at step 291 and involves originating a call from a line capable of being controlled by the Enhanced Service Platform 150. For example, in an embodiment of the invention, the provider's switch 107 (FIG. 3) may support configuring the lines associated with some or all directly attached analog phones 112 (FIG. 3) so that the Enhanced Service Platform 150 cam manage them. According to an embodiment of the invention, a call is originated in step 291 (FIG. 6) when the caller takes a phone attached to a controlled line off the hook.

The caller then enters a service code at step 292, e.g., using the DTMF keys of the analog phone 112a. In an embodiment of the invention, the service code may be, for example "*1#", and indicates to the provider's switch 107 that this call is to be managed by the Enhanced Service Platform 150. Such management may be brought about, according to an embodiment of the invention, by, e.g., establishing a circuit from the analog phone 112a, to the providers switch 107, through the PSTN 105, to the media gateway 155 within the Enhanced Service Platform 150.

The caller then dials the destination number in step 293 to place the call. At the direction of the seamless jump module 179, the media gateway 155 may detect and decode the DTMF tones representing the destination number and, at the direction of the media gateway controller 170, may respond by attempting to put the call through normally. Once the ringing destination is answered, then the managed call may be considered to have been established at step 294.

Alternative embodiments of the invention may include other methods for establishing a managed call instead of or in addition to one or both of the methods depicted in FIG. 6. For example, in an embodiment of the invention, a switch (possibly including a third-party switch 106), VoIP gateway, or other device or devices may be programmed and/or configured to place any call from one or more attached lines under the management of the Enhanced Service Platform 150. Such an embodiment of the invention may permit a caller to enter a code to except the call from some or all management features provided by the Enhanced Service Platform 150.

In an embodiment of the invention, the media gateway 155 continues to monitor a managed call to detect entry of DTMF tones that signal a seamless jump. The Enhanced Service Platform 150 may achieve this by, e.g., keeping the media gateway 155 in the circuit for the duration of the call, even when doing so extends the length of the circuit. For example, a call from a third-party to a subscriber's analog telephone line might, according to the prior art, be carried from the third party's switch 106 (FIG. 3), through the PSTN 105 (FIG. 3), and then to the provider's own switch 107 (FIG. 3). In an embodiment of the invention, the circuit may proceed from the third-party's switch 106, through the PSTN 105, through the media gateway 155, back to the PSTN 105, and then to the provider's switch 107. (This configuration is sometimes referred to in the art as a "trombone" or "hairpin".)

In an embodiment of the invention, the media gateway 155 is configured to monitor managed calls continuously for DTMF tones, decoding any detected tones and reporting them to, e.g., the supervisory module 175 in the media gateway controller 170. In such an embodiment, a subscriber may signal a jump by entering, e.g., a code beginning with a service code "", which may be followed by an ID code of additional keys to indicate the desired destination for the jump. For example, in an embodiment of the invention, the service code and ID code "C" may transfer a call to the subscriber's cellular phone, the code "H" may transfer the call to the subscriber's home phone, the code "W" may transfer the call to the subscriber's work phone, the code "M" may transfer the call to the subscriber's mobile wireless (e.g., WiFi or WiMax) phone, code "P" may transfer the call to the subscribers VoIP phone, and the code "*" followed by any phone number may transfer the call to that line. Another possibility is that the code "V" may transfer the call directly to the subscriber's voice mailbox. According to an embodiment of the invention, pressing the "#" key may cancel a jump in progress. For convenience, the DTMF tones may be muted after the detection of the service code, e.g., Upon detecting such a code, which indicates a seamless jump, the supervisory module 175 may forward the code to the seamless jump module 179 for execution of the requested jump.

When, at step 300, the appropriate module within the media gateway controller 170 detects a code indicating a seamless jump, the seamless jump module 179 causes the media gateway 155 to send a ring signal to the jump destination, as step 301. Although not shown, the seamless jump module 179 may also send a caller ID number to the jump destination. In one embodiment, the caller ID number may be the common number. In another embodiment, the caller ID number may be the native number of the other party. While the jump destination is ringing in step 301, the seamless jump module 179 may direct the media gateway 155 to cause ringing tones or another signal to be sent to some or all of the lines still on the call, possibly by retrieving a representation of the signal from the media server 160 (FIG. 2).

Depending on the embodiment of the invention and/or the configuration, the Enhanced Service Platform 150 may present a challenge to the destination when it is answered, as discussed in connection with simultaneous ringing 250, depicted in FIG. 5. Upon a successful response to the challenge, or upon answer, if no challenge is made, the seamless jump module 179 may at step 302 signal the supervisory module that the call to the new line has been established, and the supervisory module may consequently direct the media gateway 155 to terminate the call to the old destination at step 303 without further input from any party. In one embodiment, the connection to the old destination may be maintained until a connection with the jump destination has been made. For example, if the challenge is not met, then the connection with the old destination may be maintained. In step 304, the call continues from this point, and, according to an embodiment of the invention, further jumps maybe made.

Figure 7:
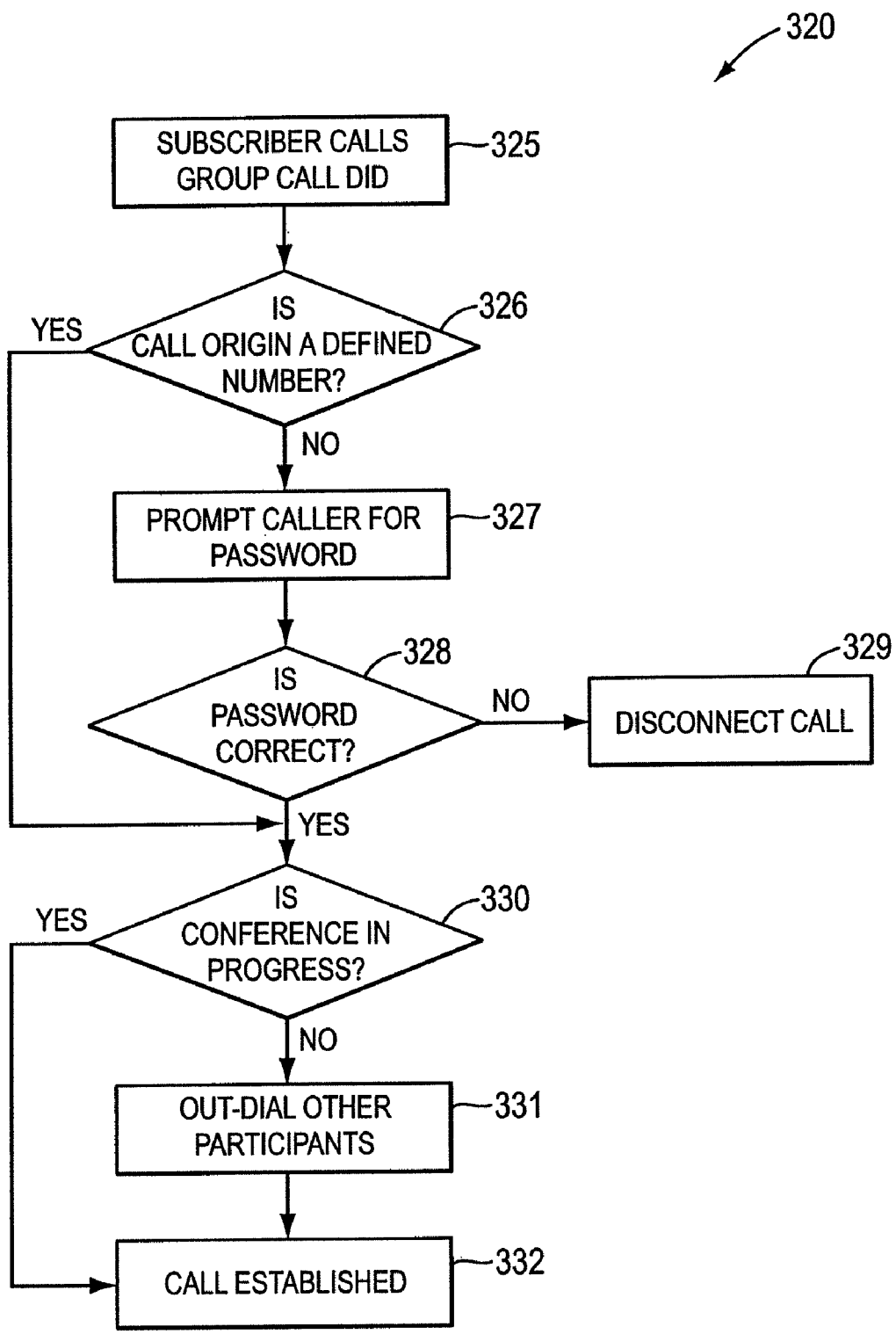
FIG. 7 is a flowchart illustrating a method of conference calling according to an embodiment of the invention.

FIG. 7 depicts establishment 320 of a group call, also referred to as a conference call, in accordance with an embodiment of the invention. The call begins when a subscriber calls a designated group call direct inward dial ("DID") number in step 325, which may connect the caller to the Enhanced Service Platform 150 at the media gateway 155. The supervisory module 175 in such an embodiment recognizes that new incoming call has specified a group call DID as the destination and directs the conference call module 180 to handle the request.

Certain telephone lines, which may be participating fines as that term was used in connection with simultaneous ringing, above, may be considered "defined numbers," which may enter a conference without further authentication. In step 326, the conference call module 180 retrieves the defined numbers associated with the current DID, e.g., from the DBMS 158, and compares the telephone number associated with the incoming call with the retrieved defined numbers. If the incoming number is found, the conference call module 180 proceeds to step 330 to try to put the call through.

If the call did not originate from a defined number, the conference call module 180 in step 327 directs the media gateway 155 to prompt the caller, e.g., with a prompt message provided by the media server 160, to enter a pass code. The media gateway 155 detects the pass code, e.g., by detecting incoming DTMF tones, and sends the entered code to the conference call module 180 for validation. In step 328, the conference call module 180 determines whether the entered code is the password. If so, the conference call module 180 proceeds to step 330 to try to put the call through. If not, then the conference call module 180 directs the supervisory module 178 to disconnect the call.

In step 330, the conference call module 180 checks to see if a conference associated with the DID is already in progress. If such a conference call exists, the conference call module directs the media gateway 155 to add the caller to the conference and, at step 332, notifies the supervisory module that the call has been established.

If no such conference call is found, the conference call module 180 creates one. In an embodiment of the invention, the conference call module 180 sets up the call by allocating and/or initializing one or more data structures representing the call and/or directing the supervisory module 175 to do likewise, and then by identifying the other numbers that are to participate in the group call, e.g., by requesting configuration information from the DBMS 158. Then, in step 331, the conference call module directs the media gateway 155 to attempt to call the other participating numbers. As participating numbers are answered, the media gateway 155 signals the conference call module 180, which adds them to the conference, possibly, according to an embodiment of the invention, after requiring the answered line to meet a challenge such as that described in connection with simultaneous ringing 250 as depicted in FIG. 5.

In an embodiment of the invention, the Enhanced Service Platform 150 provides features that are accessible to the participants in a conference call. For example, according to an embodiment of the invention, one or more new participants may be added to a conference call in progress, e.g., by a current participant's entering one or more DTMF tones, which the media gateway 155 may detect and which the conference call module 180 and/or one or more other modules within the media gateway controller 170 may interpret and then carry out corresponding commands. Seamless jumping 280 (FIG. 6) may also be available to one or more participants in a conference call according to an embodiment of the invention.

Although the embodiments above have been described using a media gateway, one skilled in the art will recognize that the embodiments can be implemented using software on any switch in the network 100, e.g., on any one of the class 5 switches or on a class 4 switch.

The foregoing description of the preferred embodiments of the present invention is by way of example only, and other variations and modifications of the above-described embodiments and methods are possible in light of the foregoing teaching. Although the network sites are being described as separate and distinct sites, one skilled in the art will recognize that these sites may be a part of an integral site, may each include portions of multiple sites, or may include combinations of single and multiple sites. The various embodiments set forth herein may be implemented utilizing hardware, software, or any desired combination thereof. For that matter, any type of logic may be utilized which is capable of implementing the various functionality set forth herein. Components may be implemented using a programmed general purpose digital computer, using application specific integrated circuits, or using a network of interconnected conventional components and circuits. Connections may be wired, wireless, modem, etc. The embodiments described herein are not intended to be exhaustive or limiting. The present invention is limited only by the following claims.

What is claimed is:

1. A method, executed by a computerized telephone services device, for providing enhanced telephone services comprising:
   a) recognizing, by the computerized telephone services device, tones generated by an originating telephone line, the originating telephone line being associated with a calling number, wherein the tones represent a common number associated with a called party and assigned to two or more telephone lines;
   b) identifying, by the computerized telephone services device, the two or more telephone lines associated with the common number;
   c) causing, by the computerized telephone services device, a first telephone line and a second telephone line of the two or more telephone lines to ring substantially simultaneously;
   d) awaiting, by the computerized telephone services device, the called party to answer via one of the two or more telephone lines;
   e) sending, by the computerized telephone services device, a challenge to the answered telephone line and waiting for the called party to satisfy the challenge if one of the two or more telephone lines is answered, wherein the challenge comprises a menu of options for routing the call;
   f) establishing, by the computerized telephone services device, a first telephone connection between the originating telephone line and one of the two or more telephone lines associated with the common number of the called party if the challenge is satisfied;
   g) detecting, by the computerized telephone services device, entry of a code from the answered telephone line, the code indicative of a request to pass the established first telephone connection from the answered telephone line to a third telephone line associated with the common number of the called party;
   h) calling, by the computerized telephone services device, the third telephone line in response to the detection of the service code;
   i) detecting, by the computerized telephone services device, whether the third telephone line has been answered by the called party;
   j) connecting, by the computerized telephone services device, the established first telephone connection between the originating telephone line and the third telephone line if the third telephone line is answered by the called party;
   k) recognizing independently of steps a-j, by the computerized telephone services device, tones generated by an originating telephone line, wherein the tones represent a request for a telephone conference over a conference line and are associated with one or more telephone lines of the called party;
   l) determining, by the computerized telephone services device, whether the calling telephone number associated with the originating telephone line is included in a set of defined telephone numbers permitted to connect to the conference line without requiring authentication of the calling party; and
   m) establishing, by the computerized telephone services device, a telephone connection between the originating telephone line and the conference line if the set of defined telephone numbers includes the calling telephone number.

2. The method of claim 1, wherein step d further comprises:
establishing, by the computerized telephone services device, a telephone connection between the originating telephone line and a voice mailbox if none of the telephone lines associated with the common number is answered.

3. The method of claim 1, wherein step j further comprises:
disconnecting, by the computerized telephone services device, the second telephone line from the first telephone connection after passing of the first established telephone connection to the third telephone line.

4. The method of claim 1, wherein step c further comprises:
sending, from the computerized telephone services device, a message to the originating telephone line.

5. The method of claim 4, wherein the message includes a conventional ringing tone, an audio message, a text message, or any combination thereof.

6. The method of claim 1, wherein step d further comprises:
sending, from the computerized telephone services device, an indication to the originating telephone line that one of the two telephone lines is engaged, that both of the two telephone lines are engaged, that the called party is unavailable, or any combination thereof.

7. The method of claim 1, wherein step e further comprises:
repeating, by the computerized telephone services device, the sending and the waiting a predetermined number of times or until the called party satisfies the challenge, whichever occurs first.

8. The method of claim 1, wherein step e further comprises:
determining, by the computerized telephone services device, that the challenge is not satisfied and therefore not establishing the telephone connection between the originating telephone line and the answered telephone line.

9. The method of claim 1, wherein the challenge includes prompting the called party for one or more of: a personal identification number (PIN), a password, a name, a number, a character, and a code.

10. The method of claim 1, wherein the code indicative of a request to pass the first telephone connection from the answered telephone line to a third telephone line associated with the common number of the called party includes a sequence of tones identifying another telephone line of the two or more telephone lines associated with the common number of the called party.

11. The method of claim 10, wherein the sequence of tones includes a service code followed by an ID code.

* * * * *

UNITED STATES PATENT AND TRADEMARK OFFICE
CERTIFICATE OF CORRECTION

PATENT NO. : 7,742,468 B2  Page 1 of 1
APPLICATION NO. : 12/552170
DATED : June 22, 2010
INVENTOR(S) : Vagelos It is certified that error appears in the above-identified patent and that said Letters Patent is hereby corrected as shown below:

| | |
|---|---|
| Col. 4, line 7: | delete the word "service" |
| Col. 10, line 15: | replace "depleted" with "depicted" |
| Col. 10, line 20: | replace "pat" with "put" |
| Col. 12, line 28: | replace "maybe" with "may be" |
| Col. 14, line 27: | delete the word "service" |

Signed and Sealed this

Seventeenth Day of August, 2010

David J. Kappos
*Director of the United States Patent and Trademark Office*

(12) EX PARTE REEXAMINATION CERTIFICATE (8935th)
United States Patent
Vagelos

(10) Number: US 7,742,468 C1
(45) Certificate Issued: Mar. 27, 2012

(54) SYSTEMS AND METHODS FOR PROVIDING ENHANCED TELEPHONE SERVICES

(75) Inventor: Ted Vagelos, Warren, NJ (US)

(73) Assignee: Frontier Communications Corporation, Stamford, CT (US)

Reexamination Request:
No. 90/009,849, Nov. 12, 2010

Reexamination Certificate for:
Patent No.: 7,742,468
Issued: Jun. 22, 2010
Appl. No.: 12/552,170
Filed: Sep. 1, 2009

Certificate of Correction issued Aug. 17, 2010.

Related U.S. Application Data

(63) Continuation of application No. 11/673,528, filed on Feb. 9, 2007.

(51) Int. Cl.
*H04L 12/66* (2006.01)
*H04M 1/64* (2006.01)
*G06F 7/04* (2006.01)

(52) U.S. Cl. .......... 370/356; 379/88.01; 726/2
(58) Field of Classification Search ............ 370/352
See application file for complete search history.

(56) References Cited

To view the complete listing of prior art documents cited during the proceeding for Reexamination Control Number 90/009,849, please refer to the USPTO's public Patent Application Information Retrieval (PAIR) system under the Display References tab.

*Primary Examiner* — Salman Ahmed

(57) ABSTRACT

A method for providing enhanced telephone services via a computerized telephone services device for use in conjunction with multiple telephone lines and providers. According to embodiments of the invention, a subscriber to telephone services or a group of subscribers may be reached on multiple telephone lines from a single dial-in-number, calls in progress may be transferred seamlessly from one line associated with a subscriber to another, and group calling features may be enhanced.

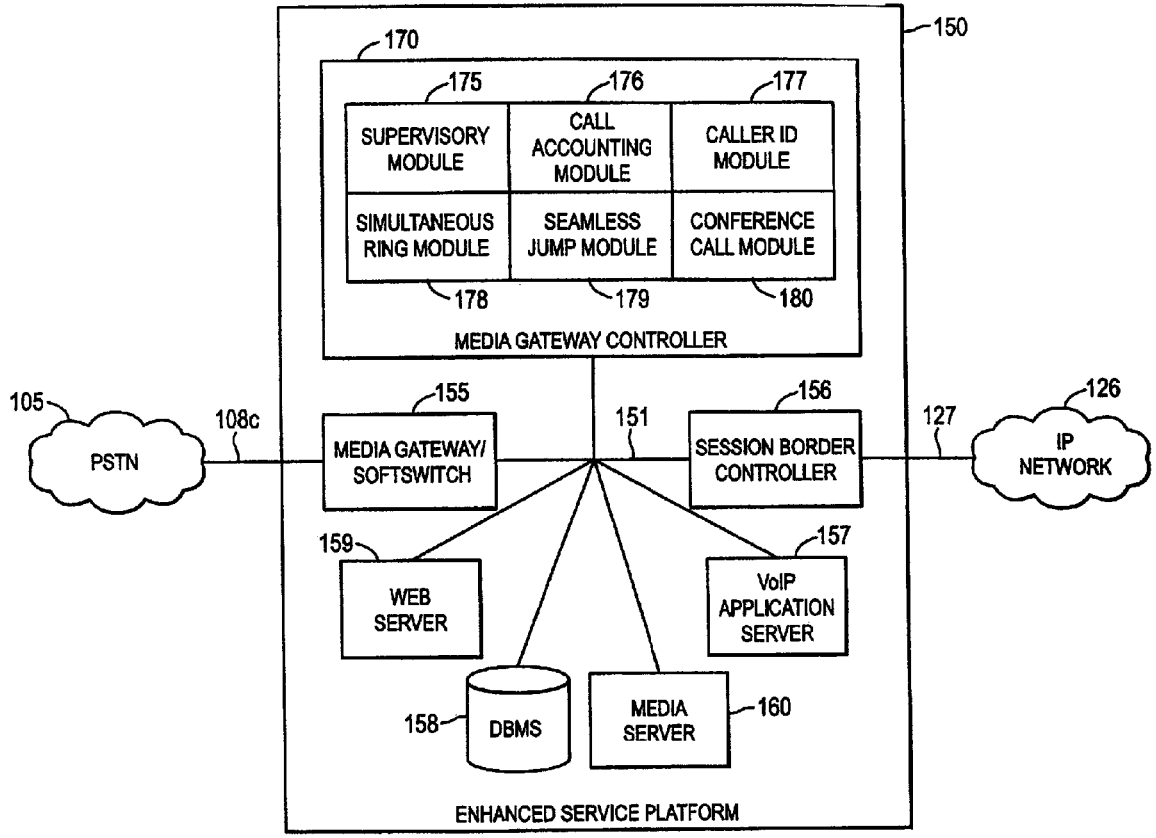

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-11 is confirmed.

New claims 12-14 are added and determined to be patentable.

*12. The method of claim 1, wherein: step b) further comprises identifying the two or more telephone lines associated with the common number as participating lines available for ringing; and the two or more telephone lines in steps c) through f) are the two or more telephone lines identified in step b) as being participating lines available for ringing.*

*13. The method of claim 12, wherein the third telephone line in step g) is one of the two or more telephone lines identified in step b) as being participating lines available for ringing.*

*14. The method of claim 1, wherein: step b) further comprises identifying the two or more telephone lines associated with the common number as participating lines available for ringing; step c) further comprises ringing each of the identified participating lines available for ringing; and wherein the third telephone line in step g) is one of the participating lines rung in step c).*

\* \* \* \* \*